United States Patent [19]

Katz et al.

[11] Patent Number: 5,495,097
[45] Date of Patent: Feb. 27, 1996

[54] PLURALITY OF SCAN UNITS WITH SCAN STITCHING

[75] Inventors: Joseph Katz, Stony Brook; Jerome Swartz, Old Fields, both of N.Y.

[73] Assignee: Symbol Technologies, Inc., Bohemia, N.Y.

[21] Appl. No.: 127,898

[22] Filed: Sep. 14, 1993

[51] Int. Cl.⁶ .................................................. G06K 7/10
[52] U.S. Cl. ............................................................ 235/462
[58] Field of Search .................................. 235/462, 467, 235/383

[56] References Cited

U.S. PATENT DOCUMENTS

| | | |
|---|---|---|
| 3,723,710 | 3/1973 | Crouse et al. . |
| 3,899,687 | 8/1975 | Jones . |
| 3,938,089 | 2/1976 | McGregor et al. . |
| 3,949,363 | 4/1976 | Holm . |
| 4,059,224 | 11/1977 | Seligman . |
| 4,075,461 | 2/1978 | Wu . |
| 4,239,151 | 12/1980 | Enser et al. . |
| 4,289,957 | 9/1981 | Neyroud et al. . |
| 4,308,455 | 12/1981 | Bullis et al. . |
| 4,329,574 | 5/1982 | Jordan, Jr. . |
| 4,360,798 | 11/1982 | Swartz et al. . |
| 4,369,361 | 1/1983 | Swartz et al. . |
| 4,387,297 | 6/1983 | Swartz et al. ............................ 235/462 |
| 4,408,342 | 10/1983 | Grabowski et al. . |
| 4,409,469 | 10/1983 | Yasuda et al. . |
| 4,409,470 | 10/1983 | Shepard et al. . |
| 4,421,978 | 12/1983 | Laurer et al. . |
| 4,460,120 | 7/1984 | Shepard et al. . |
| 4,488,678 | 12/1984 | Hara et al. . |
| 4,496,831 | 1/1985 | Swartz et al. . |
| 4,500,776 | 2/1985 | Laser . |
| 4,593,186 | 6/1986 | Swartz et al. . |
| 4,673,805 | 6/1987 | Shepard et al. . |
| 4,676,343 | 6/1987 | Humble et al. ............................ 235/383 X |
| 4,717,818 | 1/1988 | Broockman . |
| 4,736,095 | 4/1988 | Shepard et al. . |
| 4,746,789 | 5/1988 | Gieles et al. ............................ 235/462 X |
| 4,753,498 | 6/1988 | Saitoh et al. . |
| 4,758,717 | 7/1988 | Shepard et al. . |
| 4,760,248 | 7/1988 | Swartz et al. ............................ 235/472 |
| 4,782,220 | 11/1988 | Shuren . |
| 4,794,239 | 12/1988 | Allais . |
| 4,816,661 | 3/1989 | Krichever et al. ....................... 235/472 |
| 4,818,856 | 4/1989 | Matsushima et al. ................ 235/462 X |
| 4,871,904 | 10/1989 | Metlitsky et al. ........................ 235/467 |
| 4,896,026 | 1/1990 | Krichever et al. . |
| 4,901,073 | 2/1990 | Kibrick . |
| 4,916,297 | 4/1990 | Tukada et al. . |
| 4,939,355 | 7/1990 | Rando et al. ............................ 235/467 |
| 4,967,074 | 10/1990 | von Stein . |
| 4,973,829 | 11/1990 | Ishida et al. ............................ 235/462 |
| 5,019,714 | 5/1991 | Knowles ............................ 235/467 X |
| 5,028,772 | 7/1991 | Lapinski et al. . |
| 5,045,677 | 9/1991 | Okamura ................................ 235/462 |

(List continued on next page.)

FOREIGN PATENT DOCUMENTS

| | | |
|---|---|---|
| 0072910A2 | 3/1983 | European Pat. Off. . |
| 0250778A2 | 1/1988 | European Pat. Off. . |
| 0304804A2 | 3/1989 | European Pat. Off. . |
| 0385478 | 9/1990 | European Pat. Off. . |
| 60-86661 | 5/1985 | Japan . |
| 1-133184 | 5/1989 | Japan . |
| PCT/US90/00312 | 8/1990 | WIPO . |

OTHER PUBLICATIONS

NCR Corporation, "NCR 7870 Scanner and Scanner Scale" (brochure), ©1992.

Primary Examiner—Donald T. Hajec
Assistant Examiner—Jeffrey R. Filipek

[57] ABSTRACT

A scanning system has a plurality of optical scan units. Each optical scan unit includes means for emitting light toward an item bearing an indicia. Each optical scan unit also includes means for receiving light reflected from the indicia and generating signals corresponding to the intensity of the reflected light. Also provided is a central control unit which includes means for combining together signals corresponding to the signals generated by at least two of the scan units to fully decode information contained on the indicia.

45 Claims, 7 Drawing Sheets

U.S. PATENT DOCUMENTS

| | | |
|---|---|---|
| 5,059,779 | 10/1991 | Krichever et al. . |
| 5,124,537 | 6/1992 | Chandler et al. ........................ 235/462 |
| 5,124,538 | 6/1992 | Lapinski et al. . |
| 5,155,343 | 10/1992 | Chandler et al. . |
| 5,155,344 | 10/1992 | Fardeau et al. . |
| 5,194,722 | 3/1993 | Mergenthaler et al. . |
| 5,241,164 | 8/1993 | Pavlidis et al. ......................... 235/462 |
| 5,252,814 | 10/1993 | Tooley .................................... 235/383 |
| 5,256,864 | 10/1993 | Rando et al. ............................ 235/462 |
| 5,262,625 | 11/1993 | Tom et al. ............................... 235/462 |
| 5,262,626 | 11/1993 | Goren et al. ............................ 235/462 |
| 5,278,398 | 1/1994 | Pavlidis et al. ......................... 235/462 |
| 5,291,564 | 3/1994 | Shah et al. . |
| 5,296,691 | 3/1994 | Waldron et al. ........................ 235/462 |
| 5,308,960 | 5/1994 | Smith et al. . |
| 5,387,787 | 2/1995 | Waldron et al. ........................ 235/462 |
| 5,444,231 | 8/1995 | Shellhammer et al. ................. 235/462 |

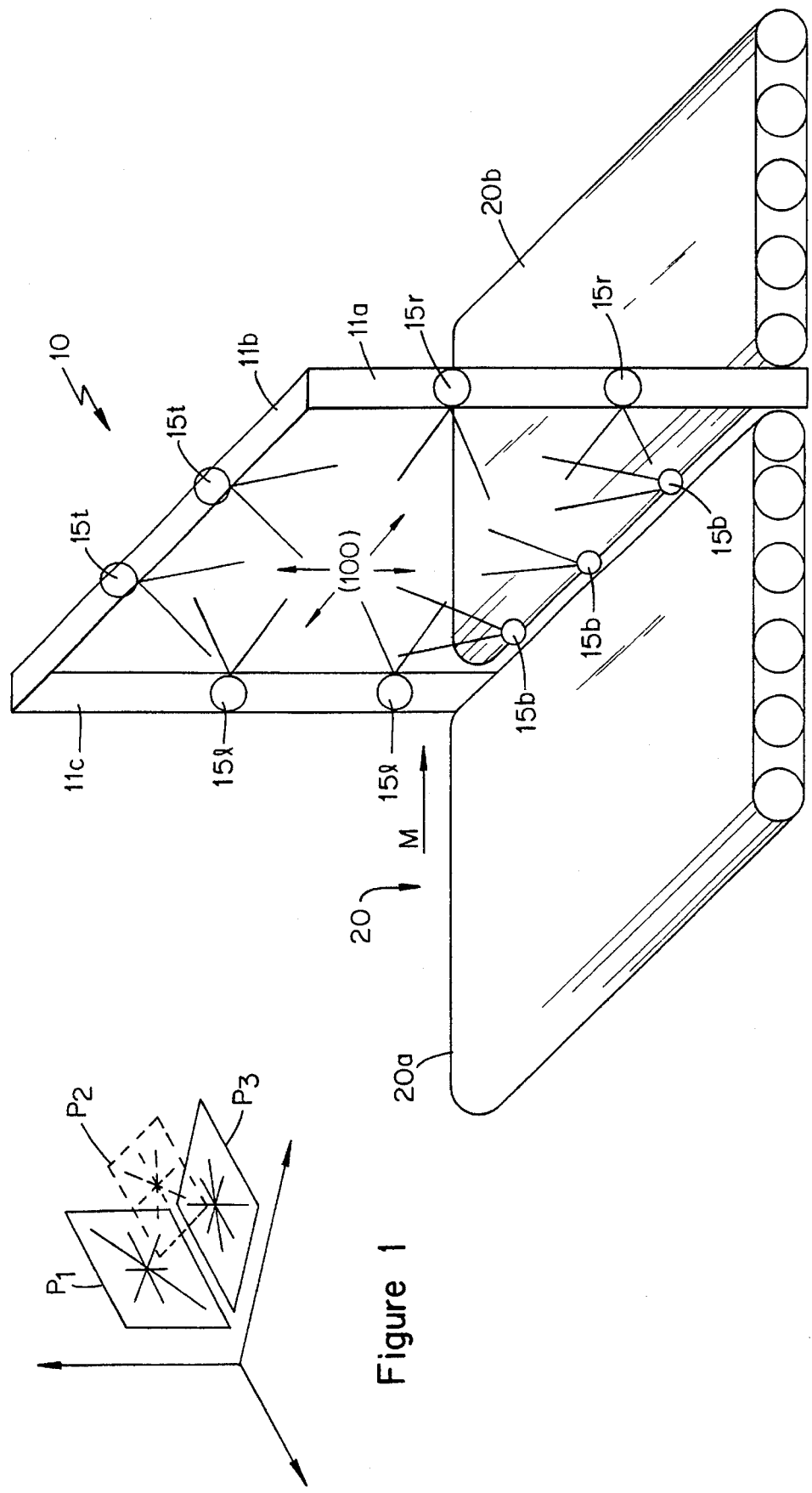

5,495,097

PLURALITY OF SCAN UNITS WITH SCAN STITCHING

TECHNICAL FIELD

The present invention relates to optical scanners for reading optically encoded indicia, such as bar codes. In particular, this invention relates to a system for scanning indicia on the surfaces of items moving through a predetermined space or opening, e.g. at a point along a conveyor belt or a check out counter.

2. Background Art

Optical readers, such as bar code readers, are now quite common. Typically, a bar code comprises a series of encoded symbols, and each symbol consists of a series of light and dark regions, typically in the form of rectangles. The widths of the dark regions, the bars, and/or the widths of the light spaces between the bars indicate the encoded information. A bar code reader illuminates the code and senses light reflected from the code to detect the widths and spacings of the code symbols and derive the encoded data.

Bar code reading type data input systems improve the efficiency and accuracy of data input for a wide variety of applications. The ease of data input in such systems facilitates more frequent and detailed data input, for example to provide efficient inventories, tracking of work in progress, etc. Bar code readers are also quite common in point of sale terminals or checkout stands. To achieve these advantages, however, users or employees must be willing to consistently use the bar code readers. The readers therefore must be easy and convenient to operate.

A variety of optical reading devices are known. One particularly advantageous type of reader is an optical scanner which scans a beam of light, such as a laser beam, across the symbols. Laser scanner systems and components of the type exemplified by U.S. Pat. Nos. 4,387,297 and 4,760,248—which are owned by the assignee of the instant invention and are incorporated by reference herein—have generally been designed to read indicia having parts of different light reflectivity, e.g., bar code symbols, particularly of the Universal Product Code (UPC) type, at a certain working or reading distance from a hand-held or stationary scanner.

In a typical optical scanner system, a light source such as a laser generates a light beam which is optically modified to form a beam spot of a certain size at the working distance and is directed by optical components along a light path toward a bar code symbol located in the vicinity of the working distance for reflection from the symbol. An optical sensor or photodetector detects light of variable intensity reflected off the symbol and generates electrical signals indicative of the detected light. A scanning component is situated in the light path. The scanning component may either sweep the beam spot across the symbol and trace a scan line across and past the symbol, or scan the field of view of the photodetector, or do both.

A digitizer, associated with or included in the scanner, processes the analog signal to produce a pulse signal where the widths and spacings between the pulses correspond to the widths of the bars and the spacings between the bars. The digitizer serves as an edge detector or wave shaper circuit, and the threshold value set by the digitizer determines what points of the analog signal represent bar edges. The pulse signal from the digitizer is applied to a decoder. The decoder first determines the pulse widths and spacings of the signal from the digitizer. The decoder then analyzes the widths and spacings to find and decode a legitimate bar code message. This includes analysis to recognize legitimate characters and sequences, as defined by the appropriate code standard. This may also include an initial recognition of the particular standard the scanned symbol conforms to. This recognition of the standard is typically referred to as autodiscrimination. Typically, the various decoder functions are performed by a microprocessor, with associated program memory and random access data memory.

Many applications involve scanning indicia on items moving along a conveyor belt or counter top, for example for scanning indicia on items to be purchased or automatically sorted. For example, the scan head may be mounted on a gooseneck or other stand so as to face downward toward the conveyor belt or counter. As an item moves along the conveyor or a consumer pushes the item along a counter top, the item passes beneath the scan head. If the indicia is on the top surface of the item, the scan head will optically scan the indicia. If the indicia is not currently on the surface of the item facing upward toward the scanner, however, the scan head can not read the indicia. To permit scanning in such a case, an operator must manually turn the item so that the indicia faces towards the scan head and is properly oriented to permit accurate scanning.

In another point of sale scanner embodiment utilizing a conveyor, a scan head is at the end of the conveyor, typically below a transparent surface substantially planar with the top surface of the conveyor. When the item bearing the indicia reaches the end of the conveyor, the operator picks up the item, orients the item in a manner to permit scanning, and moves the item over the transparent plate to permit the scanner to scan the indicia.

Many other moving spot scanners have been incorporated in gun like housings. Such handheld scanners require an operator to point the scanner at the bar code. Again, this is a labor intensive manual operation.

As can be seen from the above description, the prior art scanners still involve a substantial amount of manual handling of the items being scanned or of the scanners. A need therefore exists for a scanner which does not require an operator to manually orient the item or the scanner to permit accurate scanning. As much as possible, scanning should occur at the same time as or part of other necessary operations.

U.S. Pat. No. 4,939,355 to Rando et al. discloses an optical scanner for scanning a cubic item bearing a bar code on any one surface thereof. The Rando et al. system however, requires a complicated set of mirrors for scanning the item from six different directions. Such a complicated mirror system may be difficult to align properly and easily knocked out of alignment, for example by the impact of placement of a heavy object on the scanner/conveyor platform.

Thus a need still exists for a scanner which can scan two or more different plane or surfaces on which an indicia might appear, without resort to overly complex mirror systems. Such a scanner system should be relatively simple and robust, i.e. resistant to shock or impact damage.

DISCLOSURE OF THE INVENTION

The methods and scanner systems of the present invention address the above stated needs and overcome the problems of excessive manual operation in conjunction with use of stationary bar code scanners.

The invention provides a "tunnel" scanner or an "inverted tunnel" scanner for reading indicia from two or more different sides or directions, as the item moves relative to the scanner. The scanner effectively forms an open space through which items bearing the indicia pass in the normal course of business. In one embodiment, the tunnel opening is formed over a conveyor belt. In alternative embodiments, the opening may be at the top of a shopping cart or at the top of a well into which items drop as they are being bagged. In a further embodiment, the opening is above a counter top and the scanner is inverted. In this embodiment, the scanner scans upward and scans from one or both sides as an operator or purchaser moves the item across the counter top.

The scanners of the present invention utilize a plurality of scan heads arranged along sides of or around the opening through which items pass and oriented in different directions. Each scan head has a line of sight, i.e. a direction straight out from the scan head corresponding to the center of the scanning area or the scanning pattern produced by the individual scan head. The different scan heads of the present invention are oriented so that each has a different line of sight within the opening.

In laser scan head embodiments, the beam emitted from each scan head will scan back and forth through an angle, which effectively defines the lateral field of view of the scan head. Such scan heads also have a substantial depth of focus, often referred to as the effective "working range" of the scan head. This working range or depth of focus is defined as the range of distances from the scan head within which the scan head can still readily obtain accurate readings of indicia. A scan head is nominally optimized to scan a bar code of a specified density in a plane substantially perpendicular to the line of sight of the scan head at a specified distance from the scan head within the working range. Such scanners, however, can effectively scan many other surfaces at a variety of different angles and orientations within the field of view and working range of the scan head. Also, although nominally optimized to scan a plane perpendicular to the line of sight, such scan heads can scan indicia skewed or tilted with respect to the plane and/or with respect to the scanning pattern, so long as the scan line passes entirely across the indicia.

The scanners of the present invention utilize a plurality of scan heads oriented with their respective lines of sight aiming in different directions, so as to nominally scan two or more optimal planes within an open space. Two or more of the nominal, optimal scanning planes may be orthogonal to each other. Scan heads may be added or adjusted to also scan various angled planes. The orientation of the scan heads in a particular application is chosen so that the different nominal scanning planes of the scan heads correspond to the surfaces on which bar codes or other scannable indicia are most likely to appear as items move past the scanner. For example, if for certain types of products or items the bar code most often appears on the bottom and on one or the other of the two sides of the items, the scanner would scan up from below the conveyor or counter top and would scan from one or both sides along the conveyor or counter top into the space through which the object passes. A central control processes signals from the plurality of scan heads to produce a single decode result representing information optically encoded in the scanned indicia.

In some of the preferred embodiments, the central control includes means for generating the light for scanning and transmits that light to the scan heads through optical fibers. Light reflected from scanned surfaces also is carried by the optical fibers to the central control which further includes some form of photodetector means. Each scan head includes an optical component for directing light from a fiber towards the scanning plane, a flexible support permitting oscillatory movement of the component and a drive mechanism to initiate the oscillatory movement. In the preferred embodiment, the drive mechanism comprises a permanent magnet and a coil driven by an alternating current.

To further reduce or eliminate the need for orienting the conveyed items, the scanner system can be made omni-directional, i.e. to produce a scanning pattern which can sense bar codes regardless of orientation. Using the one-dimensional scan heads, this would require adding more scan heads on each edge or side of the scanning space, with each of the added scan heads oriented to produce scan lines in the same planes as the other scan heads but with their respective scan lines oriented at a different angle in the particular scanning plane. Preferably, each scan head produces a two-dimensional, omni-directional scanning pattern, and a preferred embodiment of a scan head providing two-dimensional scanning is disclosed in detail below.

The control system may also execute a scan stitching algorithm. As an object moves through the scanning space, the scan line from each head will pass over a corresponding surface of the object. The speed of the object and the size of the indicia may be such that the scan line produced by any given scan head does not extend entirely across the indicia during a single movement of the scanning spot along the respective scan line. When the decoder detects a reading of a part of a bar code on one traverse of the scan line by the beam spot, and another part of the code on one or more subsequent traverses, the decoder "stitches" together a complete decoded representation of the indicia from the two parts. In the present system, the decoding circuitry in the central control unit would stitch together partially read information from different scan line traverses of the spot from one scan head and/or from scanning signals from adjacent scan heads.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

FIG. 1 graphically illustrates the concept of scanning two or more planes optimized for scanning of expected item surface orientations most likely to carry an indicia.

FIG. 2 is an isometrical view of a tunnel scanner in accord with the present invention shown in combination with a conveyor belt system.

BEST MODE FOR CARRYING OUT THE INVENTION

Figure 2A:
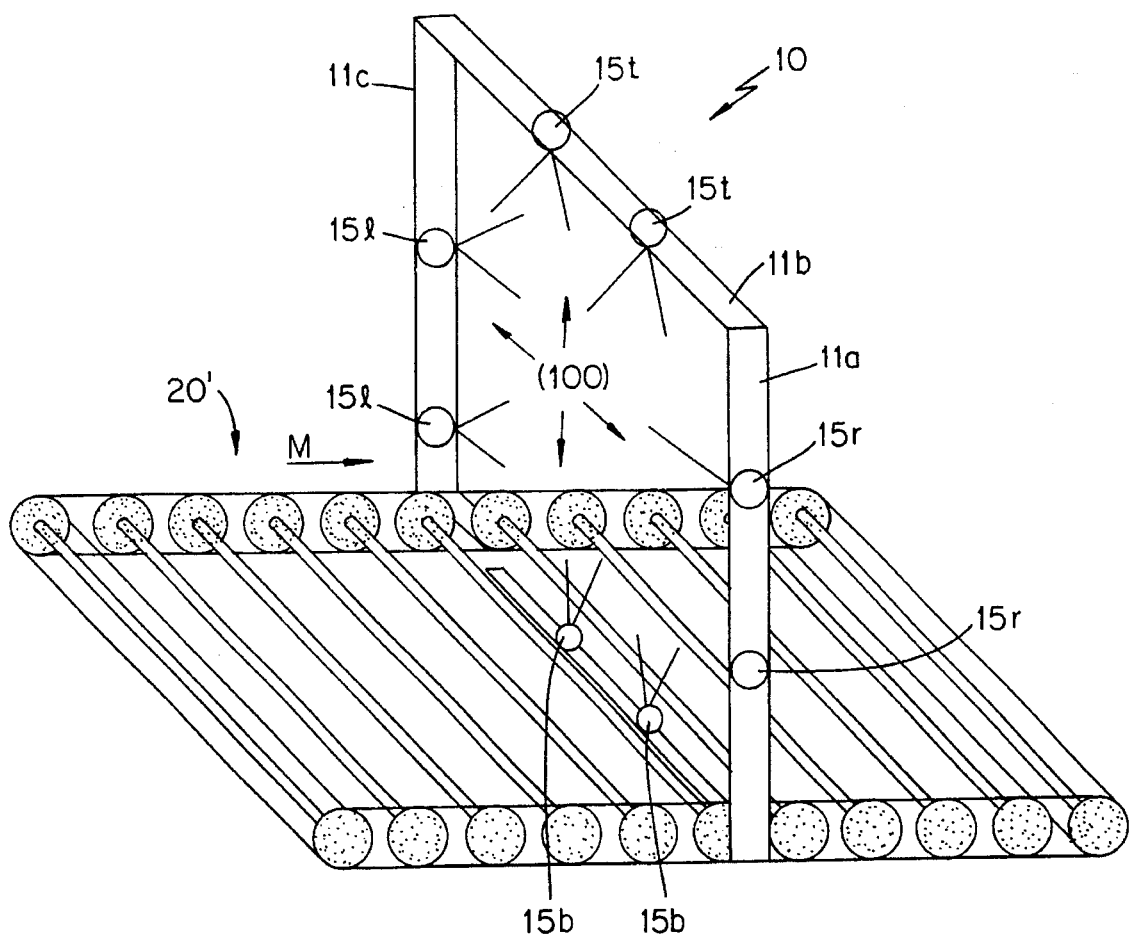
FIG. 2a is an isometrical view of another embodiment of the tunnel scanner in accord with the present invention, shown in combination with a substantially transparent conveyor belt.

As used in this specification and in the appended claims, the term "indicia" broadly encompasses not only symbol patterns composed of one or two-dimensional alternating bars and spaces of various widths commonly referred to as bar code symbols, but also other one or two dimensional graphic patterns or symbols, as well as alphanumeric characters. In general, the term "indicia" may apply to any type of pattern or symbol which may be recognized or identified by scanning a light beam and detecting reflected or scattered light as a representation of variations in light reflectivity at various points of the pattern or symbol.

The present invention utilizes a plurality of individual optical scan heads or units. Each optical scan head emits a moving spot scanning beam and receives light reflected from a surface of any item passing within the field of view and working range of the scan head. The scan heads are dispersed at various points around a scan space through which items will pass. The dispersed scan heads all face generally inward to scan the items passing through the space. The precise positions, line of sight orientations and focusing of the scan heads are chosen so that the scan heads nominally scan a plurality of different planes. The nominal scanning planes are angularly displaced relative to each other, i.e. they may be orthogonal, parallel or at an obtuse or acute angle with respect to each other, as needed to facilitate scanning of particular items expected to have particular surface orientations.

More specifically, FIG. 1 graphically illustrates the concept of scanning two or more planes optimized for scanning of expected item surface orientations most likely to carry an indicia. For example, if for particular types of items it is most likely that the indicia will appear on the top or side of the item, and the top and side surfaces are approximately orthogonal, the scanning components would be oriented and focused to nominally scan two orthogonal planes such as P1 and P3.

Essentially, plane P1 is a vertical plane oriented to coincide with one side surface of the item, as the item moves past the scanner. The plane P3 is a horizontal plane oriented to coincide with a horizontal surface of the item, as the item moves past the scanner. In the illustrated example, the plane P3 represents a scanning of the bottom surface from below the item. Additional scan heads to nominally scan other planes would be used if the indicia were most likely to appear on other surfaces of the items. For example, if the indicia is expected on the top of the item instead of or in addition to the bottom, one or more scan heads would be located above the path of the items to scan another plane which would coincide with the top of the item as it passes the scanner system. If the expected items have angular surfaces, i.e. not orthogonal, at least one scan head would be oriented and focused to produce a scanning plane such as P2 which is at the same angle as the expected indicia bearing surface. Also, the scan pattern may vary in orientation to allow for different angular orientations of the product and the indiciumas it moves past the scanner, as illustrated by the multi-line pattern shown on each plane in FIG. 1.

A single scanning head nominally scans an optimal plane, such as one of the planes P1, P2 and P3 illustrated in FIG. 1. If an indicium moves past a particular scan head in the plane that head scans, the scanning operation is optimal and most likely to produce a quick accurate reading. Moving spot scan heads of the type used in present invention, however, have a substantial field of view and effective working range. The working range or depth of focus is defined as the distance from the scan head within which the scan head can still readily obtain accurate readings of indicia, and the field of view is the lateral angle scanned by the moving beam spot.

The working range relates directly to the focal characteristics of the scanner components and to the module size or resolution of the bar code. A bar code reader typically will have a specified resolution, often expressed by the module size that is detectable by its effective sensing spot. The resolution of the reader is established by parameters of the emitter or the detector, by lenses or apertures associated with either the emitter or the detector by angle of beam inclination, by the threshold level of the digitizer, by programming in the decoder, or by a combination of two or more of these elements. Within the working range, the effective spot size of the scan head is such as produce accurate readings of bar codes for a given bar code line density. For purposes of the present invention, the effect of the working range is that each scan head can read indicia passing in its scanning plane, and can read indicia passing in front of or behind its scanning plane and tilted or skewed with respect to the beam so long as the indicia pass within the field of view and working range of the particular scan head and the beam scans entirely across the indicia. Thus, although optimized for scanning a nominal plane, each scan head can effectively scan indicia on surfaces corresponding to that plane and on surfaces oriented parallel to or at some range of angles with respect to the nominal scanning plane. Each scan head positioned and oriented to have a different line of sight scans either a different nominal scanning plane or a different field of view within a given plane.

Several of the preferred embodiments scan at least two and preferably four different nominal scanning planes. The 'tunnel' scanner of FIG. 2 effectively defines a three dimensional scanning space 100, bounded on four sides, through which conveyed objects move. The scan heads 15 located along the top, sides and bottom face into the space 100 and together scan at least four orthogonal scanning planes. Selected or additional scan heads may be oriented to scan along different lines of sight which are angled with respect to the orthogonal planes and/or with respect to the direction of motion of the items, to scan additional relevant planes.

FIG. 2 shows an embodiment of a tunnel scanner 10 wherein the tunnel scanner 10 is set up to scan items passing along a conveyor belt system 20. In the illustrated embodiment, scan heads 15 are located around all four sides of a scanning space 100, i.e. with scan heads 15r on the right side, scan heads 15t on the top, scan heads 15l on the left and scan heads 15b on the bottom.

As shown, the belt system comprises two adjacent conveyors 20a and 20b. There is a small space between the two adjacent conveyors 20a and 20b. In operation, the first conveyor 20a will move items in the direction M to the gap and push the leading edge of the item out over the gap until it contacts the surface of the second conveyor 20b. The second conveyor 20b will then grab the leading edge of the item and pull the item the rest of the way across the gap and move the item onward in the direction M to the end of the conveyor system. A number of scan heads 15b, positioned in the gap between the two adjacent conveyors 20a and 20b, are below the path of the items moved by the conveyor and face upward to scan the bottom surface of the items passing over the gap. A transparent plate (not shown) may cover the gap between the conveyors 20a, 20b, to bridge the gap and to protect the scan heads 15b.

The tunnel scanner includes an inverted, substantially U-shaped support bracket. As shown, the bracket includes two vertical sections 11a and 11c and a horizontal section 11b extending between the upper ends of the vertical sections. The lower ends of the vertical bracket sections 11a, 11c are positioned adjacent to the gap between the two separate conveyor belts 20a, 20b on opposite sides of the conveyor belt system 20. The belt system 20 and the tunnel scanner 10 together define the scanning space or opening 100 through which items on the conveyor pass.

Each section 11a, 11b, 11c of the support bracket supports a number of scan head units 15r, 15t and 15l, respectively. In the embodiment shown, there are two scan heads 15 on each bracket section and three along the bottom of the space 100 in the gap between the conveyors 20a, 20b, but there could be fewer or more scan head units depending on the size of the opening, the field of view of the particular scan head design and the expected size and shape of objects which the system will scan.

In one preferred embodiment, each of the scan head units 15 receives light from a central control unit 30 (FIG. 3) via an optical fiber and directs the light in a scanning pattern into the space or opening between the tunnel scanner 10 and the conveyor belt 20. Each of the scan head units 15 also receives light reflected from surfaces of the items which the conveyor belt 20 moves through the opening under the tunnel scanner 10. In the optical fiber preferred embodiment, the scan head units 15 transmit the reflected light back through optical fibers to the central control unit 30 for processing.

In the simple embodiment shown, it is assumed that the items moved by the conveyor system 20 have six square or rectangular sides orthogonal with respect to each other. Most packing boxes exhibit such a shape. For simplicity of discussion here, it is also assumed that typically the bar code symbol or other indicia will most often appear on the top or bottom of the item, or on the left side surface or the right side surface of the, as the item moves through the scanning space 100. The line of sight of the various scan heads 15 along each edge of the scanning space 100 aim directly into the opening. Each scan head therefore nominally scans a plane substantially parallel to the direction of motion M of the items moved by the conveyor system 20. The scan heads 15 mounted along the same edge of the opening 100 scan different fields of view and therefore scan different sections of the same nominal scanning plane. These sections may be contiguous or may overlap slightly. As such, the scan heads shown scan four different nominal scanning planes within the scanning space 100. Additional scan heads may be provided to scan along different lines of sight and/or with respect to different nominal scanning planes, for example to scan front and back surfaces of items passing through the space 100.

The lower scan heads 15b scan a bottom plane corresponding to the expected bottom surface of items moving along the conveyors, i.e coinciding with or closely parallel to the plane of the top surface of the conveyors 20a, 20b. This nominal scanning plane would correspond to plane P3 in FIG. 1. The upper scan heads 15t face down and nominally scan a top plane corresponding to the expected top surface of items moving along the conveyors, i.e parallel to but at a distance above the plane of the top surface of the conveyors 20a, 20b. Because of the extended working range of the moving spot laser beam scan heads, the heads 15b and 15t can scan indicia on top and bottom surfaces on packages of a wide range of sizes. Also, the actual surfaces scanned need not coincide with or be parallel to the nominal scanning planes, as discussed below.

The left side scan heads 15l on bracket section 11c have horizontal lines of sight and nominally scan a vertical side plane corresponding to the expected right side surface of items moving along the conveyors. This nominal scanning plane corresponds to the plane P1 in FIG. 1 and is substantially perpendicular to the plane of the top surface of the conveyors 20a, 20b. The right side scan heads 15r on bracket section 11a also have horizontal lines of sight but nominally scan a vertical side plane corresponding to the expected right side surface of items moving along the conveyors. This right side scanning plane would be parallel to but at a distance from the plane P1. Due to their extended working range, the scan heads 15l and 15r can effectively scan indicia on side surfaces of packages of a wide range of sizes and essentially at any lateral position on the conveyor system as the packages pass through the scanning space 100. Again, the actual surfaces scanned need not precisely coincide or be parallel to the nominal scanning planes.

FIG. 2 shows the tunnel scanner 10 located at a transfer point between two separate belts of the conveyor belt system 20. As noted above, this permits location of scan heads 15b below the path of the conveyed items so as to face upward and scan the lower surface of the conveyed items. If it were not necessary to scan from below, the scanner could be positioned anywhere along the belt system that is convenient or at which it is desired to identify items. For example, in a point of sale terminal, it might be desirable to place the scanner at the end nearest the cash register. Where the conveyor belt is used for manufacturing operations, there might be a number of scanners at different points along the conveyor to identify transported items which the belt transports to various work stations located at different distances along the belt.

To further enhance the ability of the scanner system 10 to scan objects without requiring manual orientation of the objects, the system 10 would include a number of additional scan heads (not shown) oriented to nominally scan different planes. If some objects have surfaces at different angles, so tilted or skewed that indicia on such surfaces would not pass within the field of view of the scan heads shown, the additional scan heads might scan planes such as P2 in FIG. 1 which would correspond to the expected surface angle. To scan front and back surfaces of the objects, additional scan heads mounted on the bracket and or in the gap between the conveyors might be aimed upstream and downstream to scan planes at an angle to the line of motion M.

FIG. 2a shows the tunnel scanner 10 set up to scan items passing along a modified conveyor belt system 20'. Like elements of the tunnel scanner are indicated by the same reference numerals as in FIG. 2 and operate in the same manner as discussed above. In the embodiment of FIG. 2a, the actual belt of the conveyor system 20' consists of a flexible, substantially transparent material, such as a transparent plastic sheet or film. The system 20' therefore uses a single belt, without a gap or transparent plate as in the earlier embodiment. In FIG. 2a, the scan heads 15b (two shown) positioned below the path of the items moved by the conveyor system 20' are positioned inside the loop formed by the belt, i.e. between the upper and lower sections of the conveyor belt. The scan heads 15b are located between two of the roller sets on which the transparent conveyor belt moves and face upward (substantially vertical lines of sight) to scan the bottom surface of the items through the transparent material of the belt.

Figure 3:
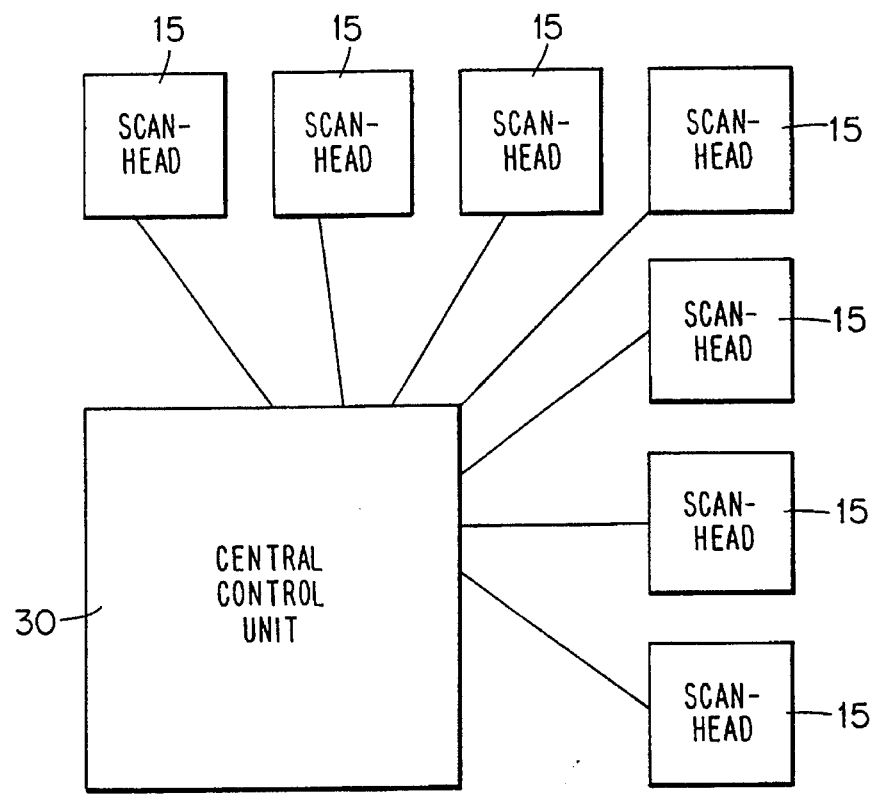
FIG. 3 is a simplified block diagram of the components of an optical scan system in accord with the present invention.

FIG. 3 shows in simplified block diagram form the connection of the central control unit 30 to each of the optical scan head units 15. In one embodiment, each bundled cable connecting the central control unit to one of the scan heads 15 includes two optical fibers, one carrying laser light to the scan head and one carrying light reflected off a scanned object back to the control unit 30. The cable will also include a number of electrical leads to carry a drive current to some form of scan motor in the scan head to produce the desired scanning motion of the emitted laser beam.

The central control unit 30 will include circuitry for producing the necessary drive signal, a light emitter such as one or more visible laser diodes, one or more photodetectors for converting the reflected light to corresponding electrical signals, and circuitry for processing those electrical signals. The processing circuitry includes the amplification stages, digitizer, etc. for processing the electrical signal from the photodetector to produce a single decoded representation of the information contained in scanned bar code symbols or other scanned indicia. The central control will also include some means to output the decoded information, for example to a host computer. The host computer may supply the control unit with information, such as price data, to provide displays to operators or customers using the scanner system.

Figure 4B:
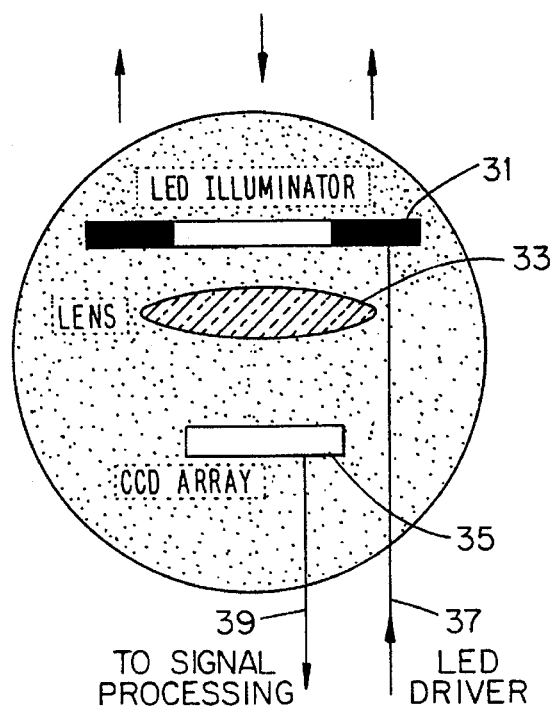
FIG. 4b illustrates another embodiment of the scan head used in the scanner system of the present invention.
Figure 4:
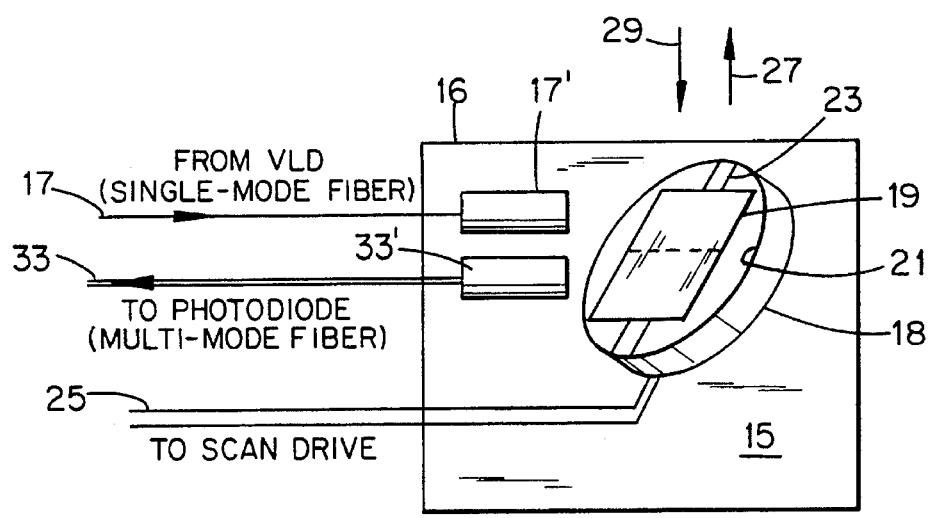
FIG. 4 illustrates a first embodiment of the scan head used in the scanner system of the present invention.

FIG. 4 illustrates a first preferred embodiment of one of the scan heads 15 used in the tunnel scanner 10 of FIG. 2. The scan head 15 receives laser light from a visible laser diode (VLD) in the central control unit 30 via a single mode optical fiber 17. A printed circuit board 16 supports a lens 17' attached to the light emitting end surface of the fiber 17, in such a position that the laser light carried by the fiber 17 emerges from the lens 17' and impinges on a scanning mirror 19.

The circuit board 16 also supports a drive coil 18, and the scanning mirror 19 is pivotally supported in an opening 21 through the coil 18. In the preferred embodiment, the pivotal support comprises a single flexible strip 23 extending across the opening 21. The mirror is glued or otherwise attached to the center of the flexible strip. The flexible strip may comprise a Mylar™ or Kapton™ film. The scan head 15 may use a variety of other pivotable support structures. For example, the pivotal support may comprise a torsion wire spring extending across the opening, or two separate flexible strips or springs each attached between the side of the mirror and the adjacent side surface of the opening 21. In the rest position, shown in the drawing, the mirror 19 is at an angle with respect to the emitted light from fiber 17 to redirect that light generally into the scanning space 100.

A permanent magnet, represented by a dotted line in FIG. 4, is also attached to the center of the flexible strip 23 behind the mirror 19. The permanent magnet is aligned so that the axis between its north and south poles is perpendicular to the axis of coil 18. For example, the axis of the permanent magnet could be parallel to or within the plane of FIG. 4, and the axis of the coil 18 would be perpendicular to the plane of that drawing. The axis of the permanent magnet would also be perpendicular to the axis of the flexible strip 23.

The coil 18 and permanent magnet form a scanning motor for causing the mirror 19 to oscillate back and forth on the pivotal support structure formed by the flexible strip 23. More specifically, the coil 18 serves as an electromagnet receiving a drive current signal from the central control unit 30 on the electrical leads 25. When a current is introduced through the coil 18, interaction between magnetic fields of the coil and the permanent magnet creates a torque causing the permanent magnet and the attached mirror 19 to move from an equilibrium position. This torque on the permanent magnet tends to force the axis of permanent magnet in line with the axis of coil 18. The torque and resulting motion of the permanent magnet cause the flexible strip 23 supporting the mirror 19 to twist and produce a return force. This return force is effectively trying to bring the permanent magnet and the mirror back to the rest position.

Reversing the polarity of the current applied to the coil 18 will reverse the directions of the magnetic force. Therefore, if the current applied to the coil 18 through leads 25 takes the form of a cyclical AC signal, such as a sine wave, a pulse signal, a triangular wave, etc., the induced magnetic forces and the return forces produced in the flexible strip will produce an oscillatory movement of the permanent magnet and the attached mirror 19. The flexible strip(s) twist back and forth causing the mirror to oscillate.

The laser beam emitted from the lens 17' attached to the end of the first optical fiber 17 impinges on the scanning mirror 19 and is directed along a light path shown by the arrow 27, toward an object to be scanned. The oscillating motion of the mirror 19 causes the light path 27 to pivot back and forth (into and out of the plane of FIG. 4) to produce a scan line across any object passing through the opening 100 under the tunnel scanner.

Light 29 reflected off of a scanned object also impinges on the mirror 19. The mirror directs the reflected light 29 to a collecting lens 33' on the light receiving end of a multi-mode optical fiber 33. The lens 33' might be eliminated if the mirror 19 includes a curved surface to focus the reflected light on the receiving end of the fiber. The second fiber 33 transmits the reflected light to a detector in the central control unit 30.

Figure 5:
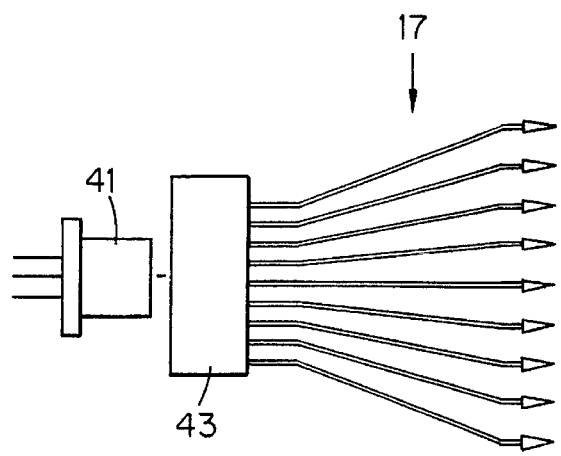
FIG. 5 depicts the laser diode and the system for coupling light therefrom to a plurality of optical fibers for transmission to the scan heads.

The central control unit 30, in this embodiment, contains a light emitter for producing the beam of light used in scanning optically encoded indicia. FIG. 5 depicts one embodiment of the emitter and the means to couple the emitter to the single mode fibers 17 for transmission to each of the scan heads 15. As shown, a high power visible laser diode (VLD) 41 emits light into a mechanical/optical coupler 43 positioned adjacent the output of the VLD 41. The coupler 43 provides physical support for the end of each of the fibers 17 at an appropriate position to receive the beam. The coupling device 43 may also include optical means, such as one or more lenses, to provide efficient coupling of the light from the VLD 41 into the plurality of transmitting optical fibers 17. Each of the fibers 17 carries a portion of the emitted laser light from the coupling device 43 in the central control 30 to a respective one of the optical scan heads 15. As an alternative to the embodiment of FIG. 5, the central control unit could use a separate VLD of low power, and a separate coupler, for transmitting the laser beam from one VLD through one fiber to each one of the scan heads.

Figure 6:
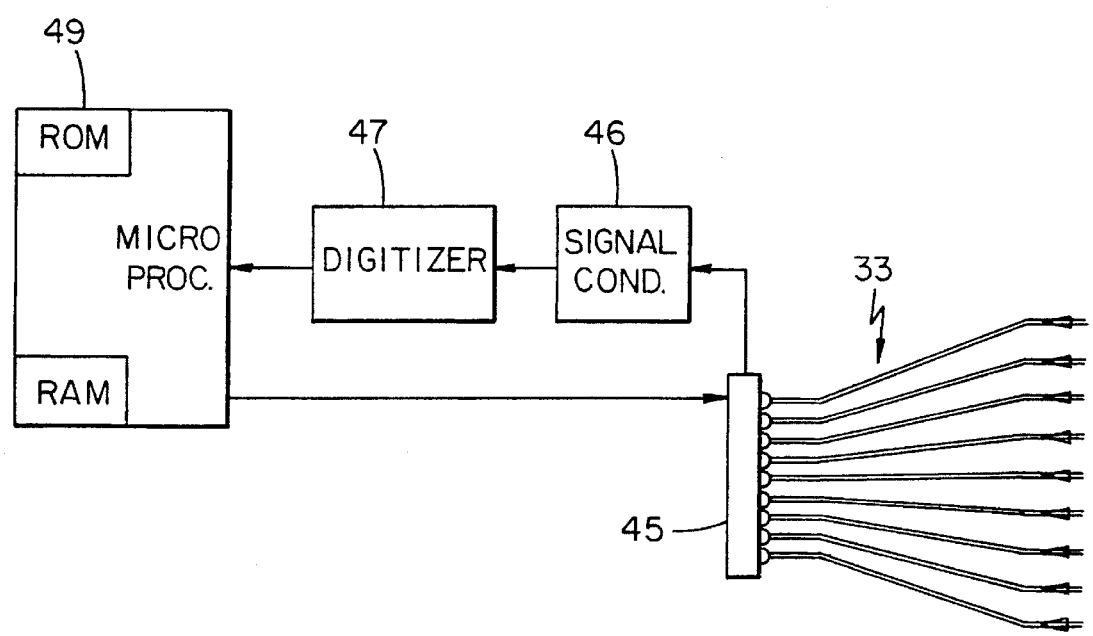
FIG. 6 depicts a photodiode array coupled to return optical fibers to receive reflected light transmitted back from the scan heads and a simplified block diagram of the associated signal processing circuitry.

The central control unit 30 also contains a photodiode array 45 and associated signal processing circuitry to produce a single decode result, shown in FIG. 6. The photodiode array 45 is coupled to the multi-mode return fibers 33, to receive reflected light transmitted back from the scan heads. The signals from the different photodiode elements of the array 45 are clocked out to a single high speed processor for digitizing and decoding, in a manner similar to processing signals from a charge coupled device (CCD) type bar code reader. In the illustrated example, the high speed processor/decoder comprises a signal conditioning circuit 46, a digitizer 47 and a microprocessor 49 (with RAM and ROM). The microprocessor 49 provides control signals to the array 45 to clock out the signals from the photodiode elements of the array. The analog signal from the photodiode array is amplified, inverted and conditioned by the analog signal conditioning circuit 46. The digitizer 47 processes the analog signal to produce a pulse signal where the widths and spacings between the pulses correspond to the widths of the bars and the spacings between the bars. The digitizer 47 serves as an edge detector or wave shaper circuit, and the threshold value set by the digitizer determines what points of the analog signal represent bar edges. The threshold level effectively defines what portions of a signal the scanner system will recognize as a bar or a space. The microprocessor 49 demultiplexes the clocked output signals from the array 45, representing light transmitted back from the individual scan heads 15. Alternatively, the demultiplexing may be performed prior to digitizing. The microprocessor 49 first determines the pulse widths and spacings of the individual signals from the digitizer. The microprocessor 49 then analyzes the widths and spacings of each signal to find and decode a legitimate bar code message represented by the photodiode signal corresponding to light transmitted back by one of the scan heads.

Alternatively, the central control unit 30 could include a separate photodetector for receiving reflected light via each of the fibers 33. In such an embodiment, there could be a separate signal conditioning circuit, digitizer and decoder arrangement responsive to each photodetector output, and one of the decoder's would signal when it was first to achieve a valid decode result. Alternatively, the digitized signals from the plurality of photodetectors could be processed in parallel by a single high speed decoder. In each case, the central control includes some form of processor means to analyze the signals from the various scan heads, recognize decodable data represented by one or more of the signals from the scan heads, and decode that data to produce a single decode result for each scanned indicia.

The scan heads discussed so far produce a one dimensional scanning pattern, i.e. the beam spot moves along a scan line. To read bar code type symbols with such a scanning pattern, the bars of the symbol must be at a substantial angle approaching 90° with respect to the scan line. If the bars are too nearly parallel to the scan line, the scan line will not scan across the entire length of the bar code symbol. If exactly parallel, the scan line will pass over only one bar or only one space. In the scanner system shown in the present embodiment, if the scan lines of all of the scan heads are parallel to the direction of motion M, the items on the conveyor must be oriented so as to present the bar code in such a manner that the bars thereof are perpendicular or sufficiently close to perpendicular to the direction M, to permit one of the scan heads to read the code.

To further reduce or eliminate the need for orienting the conveyed items, the scanner system can be made omni-directional, i.e. to produce a scanning pattern which can sense bar codes regardless of orientation. Using the one-dimensional scan heads 15 discussed so far, this would require adding more scan heads on each edge or side of the scanning space 100. These added scan heads would be oriented to produce scan lines in the same planes but with their respective scan lines oriented at a different angle in the particular scanning plane. The lines crossing in the different planes P1, P2 and P3 in FIG. 1 represent scan lines of different orientation within each plane.

Figure 4A:
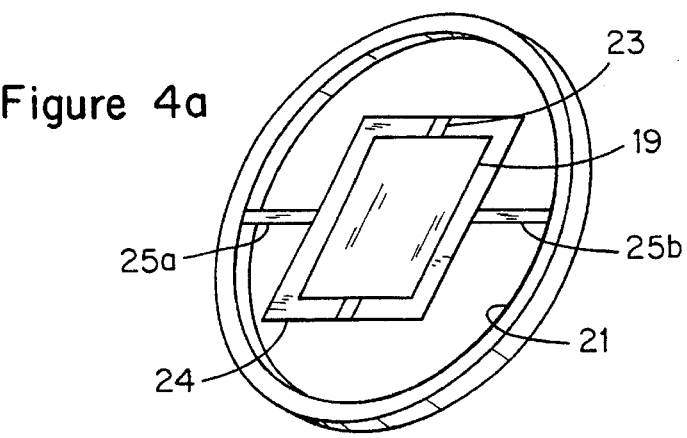
FIG. 4a illustrates an alternate mirror and scanning motor arrangement for producing a two-dimensional scanning pattern, typically for omni-directional scanning.

Alternatively, each scan head might produce an omni-directional scanning pattern such as one of the patterns disclosed in U.S. Pat. Nos. 4,816,661 and 4,871,904 the disclosures of which are herein incorporated by reference. To produce such a pattern, the scan head structured must produce two directions of motion of the scanning pot, at carefully selected frequencies and phases. FIG. 4a shows a modification of the scanning motor which would produce such a two dimensional scanning pattern for omni-directional scanning.

The scanning motor shown in FIG. 4a would replace the coil, mirror and single pivotal support arrangement shown in FIG. 4. In the scanning motor of FIG. 4a, the mirror 19 is again attached in the center to a flexible strip 23, as in the first scan head embodiment. In the two dimensional embodiment, however, the flexible strip extends across and attaches at its ends to a rigid support frame 24. The support frame 24 consists of a non-magnetic material, such as hard plastic or a metal such as a beryllium-copper alloy. The flexible strip 23 attached to support frame 24 permits the mirror 23 to pivot back and forth about a first axis, i.e. the axis of the flexible strip 23.

A pair of additional flexible strips 25a, 25b extend from the sides of the support frame 24 to the edge of the coil 18. The flexible strips 25a, 25b permit the support frame 24 to pivot back and forth about a second axis i.e. the axis of the flexible strips 25a, 25b. The pivotal oscillation of the support frame 24 produces a corresponding pivotal oscillation of the mirror 29 supported thereby.

To produce the desired two-dimensional scanning patterns, the vibrational movement about one axis should be at a higher frequency than the vibrational movement about the other axis. Each spring system, i.e. the first spring system formed by flexible strip 23 and the second spring system formed by flexible strips 25a, 25b, will vibrate at a characteristic frequency. In general, when a spring must move a higher mass it vibrates at a lower characteristic frequency. In the system of FIG. 4a, the first flexible strip 23 carries the mass of the permanent magnet (shown by the dotted line) and the mirror 19. In addition to this mass, the second spring formed by the flexible strips 25a, 25b carries the mass of the first flexible strip 23 and the mass of the rigid support frame 24. As a result, the mass moved by the second spring system formed by flexible strips 25a, 25b is somewhat higher than the mass moved by the first spring system formed by the flexible strip 23. For some desired patterns, the difference in vibration frequencies caused by this mass differences may be sufficient. To further increase the mass difference, the frame 24 may support a balancing weight (not shown). To produce additional differences in vibration frequencies, the flexible strips may be designed differently, e.g. using different materials and/or different thickness of the flexible film strips.

The scanning motor in the embodiment of FIG. 4a can still utilize a single permanent magnet, depicted as a dotted line in FIG. 4a. The permanent magnet is mounted behind the mirror 19. The orientation of the poles of this magnet will be different from that used in the embodiment of FIG. 4. The embodiment of FIG. 4a also relies on a carefully selected drive signal applied to the electromagnet formed by coil 18.

Assume that the axis of the permanent magnet is parallel to or within the plane of FIG. 4a, and the axis of the coil 18 is perpendicular to the plane of that drawing. Instead of being perpendicular to the axis of the flexible strip 23, as in the embodiment of FIG. 4, the axis of the permanent magnet is at a 45° angle with respect to the axis of the flexible strip 23 and at a 45° angle with respect to the axis of the additional flexible strips 25a, 25b.

When there is no current through the coil 18, the resilient nature of the first and second spring systems causes the mirror 19 and the attached permanent magnet to return to the rest or equilibrium position shown in FIG. 4a. When a current is introduced through the coil 18, interaction between the magnetic fields of the coil and the permanent magnet creates a moment of force moving the permanent magnet and mirror 19 away from the rest position. Because the axis of the permanent magnet is at a 45° angle with respect to both pivot axes, forces applied to that magnet will include a vector orthogonal to each axis of rotation and will move the magnet away from its rest position with respect to both axes. As a result of such motion, a spring force is produced by the first spring formed by flexible strip 23, and another spring force is produced by the second spring system formed by flexible strips 25a, 25b. These spring forces oppose the motion and tend to bring the permanent magnet and mirror 19 back to the rest position. Reversing the polarity of the applied current will reverse the directions of the magnetic forces and the opposing spring forces. Therefore, if the current applied to the coil of the electromagnet coil 18 takes the form of a cyclical AC signal, such as a sign wave, a pulse signal, a triangular wave, etc., the induced magnetic forces and resultant spring forces will produce an oscillatory movement or vibration of the permanent magnet 109 about both axes.

To produce the two different frequencies of motion about the two different axes, the drive signal applied to the electromagnet comprises a superposition of two cyclical signals of different frequencies. The first signal component has a frequency within a high range of frequencies corresponding to the characteristic vibration frequency of the flexible spring strip 23. The second signal component has a frequency within a low range of frequencies corresponding to the characteristic vibration frequency of the spring formed by the pair of flexible strips 25a, 25b. Thus the vibratory magnetic forces applied to the permanent magnet will include the two different frequency components corresponding to the two component signals in the drive signal. Because of the different characteristic frequency of vibration of the two spring systems, each spring system will vibrate only at its natural vibration frequency in response only to the force vector orthogonal to its corresponding pivotal axis. Thus when the electromagnet coil 18 is driven by such a superposition signal, the first spring formed by flexible strip 23 will vibrate about the first axis at a frequency in the high range of frequencies, and the second spring system formed by the pair of flexible strips 25a, 25b will vibrate about the second axis at a frequency in the low range of frequencies.

In operation, a transmitting fiber 17 and associated lens 17' will emit light toward the mirror in the same manner as discussed above with regard to the embodiment of FIG. 4. In the embodiment of FIG. 4a, however, the mirror 19 oscillates in two orthogonal directions at the two different frequencies, as discussed above. This oscillation of the mirror 19 causes the reflected beam 27 to scan back and forth in one direction and up and down in the other direction. The frequency of the vibrations and the phase relationship of the drive signal components are chosen to produce an omnidirectional scanning pattern which will include a series of differently oriented lines. The light reflected back by the indicia would be transmitted to the central control 30 and detected by photodiode array 45, and the detector signal proportional to the intensity of the reflected light would be processed, digitized and decoded in the same manner as in the earlier embodiment.

The present invention can utilize a variety of other scan head structures. For example, to produce the scanning motion in the second direction, rather than oscillate the mirror in a second direction, the ends of the fibers and/or the associated lenses 17', 33' might move in a direction orthogonal to the oscillation relative to the axis of the flexible strip 23. If only one-dimensional motion is desired for a particular scanning application, the mirror could be eliminated and the ends of the fibers moved. Systems for oscillating the end of optical fibers for scanning purposes are disclosed in commonly assigned copending application Ser. No. 07/957,845, the disclosure of which is incorporated herein by reference.

Figure 4C:
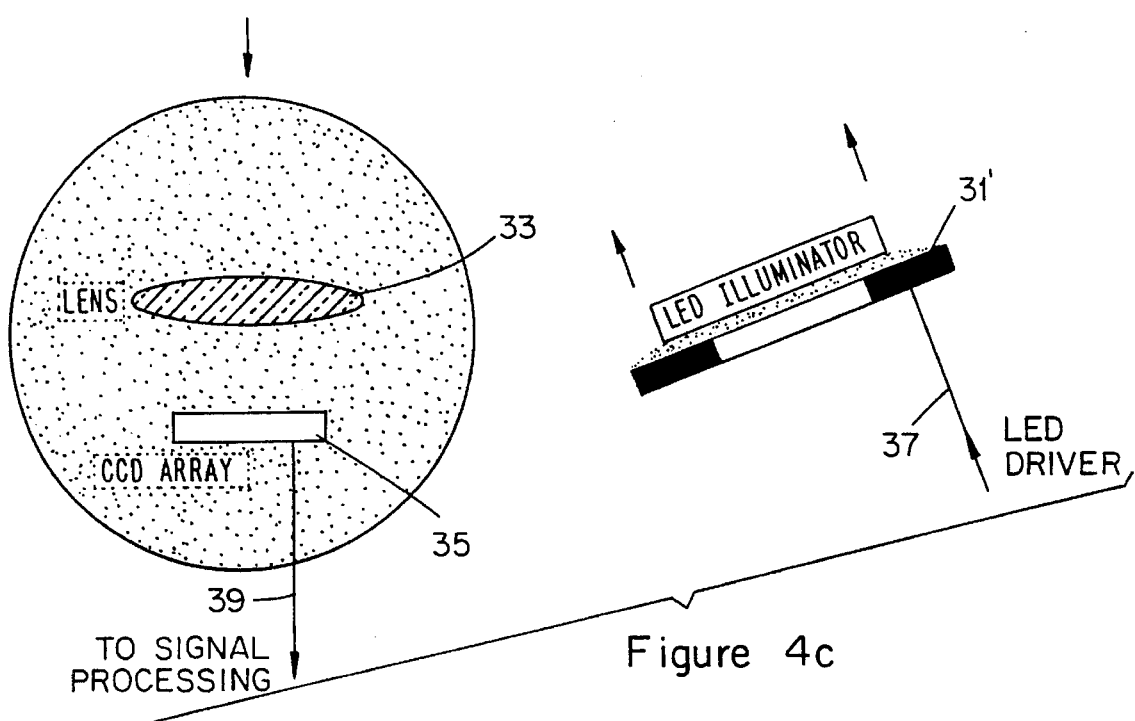
FIG. 4c illustrates a modified version of the scan head of FIG. 4b.

FIG. 4b illustrates another alternative form of scan head, which uses a charge coupled device (CCD). This embodiment also does not rely on fiber optic connection to the central control. The embodiment of FIG. 4b includes a light emitting diode (LED) illuminator 31' 33 to generate a large quantity of light and illuminate indicia bearing surfaces of items passing through the scanning space. The illustrated LED illuminator 31 in the scan head receives a drive signal from the central control via a cable 37. The CCD array 35 as shown in FIG. 4C is a linear array which essentially functions as a one dimensional camera sensor. Light reflected from an illuminated surface is focused or imaged onto the CCD array 35 by a lens 33. Elements of the array 35 each accumulate a charge level corresponding to the level of light which impinges thereon. The accumulated charge levels in the CCD array 35 are shifted out as a series of voltage signals over the cable 39 going to the central control for appropriate analysis and decoding. As an alternative to the illustrated LED embodiment of FIG. 4b, a large separate illuminator 31' could be provided along one or more sides of the scanning space to generally flood the space with illuminating light, in which case, the individual scan heads would include only the lens 33 and the CCD image sensing array 35 as shown in FIG. 4c.

Another alternative would be to include the photodetector and/or the VLD in the scan head. An example of a small scan module incorporating the laser diode and the photodetector is disclosed in commonly assigned copending U.S. patent application Ser. No. 07/952,414, the disclosure of which is incorporated herein in its entirety by reference. In fact, the slim-scan module disclosed in that prior application includes the circuitry to drive the laser diode and the scanning motor and the circuitry to process and decode the signal from the photodetector. In an embodiment of the present invention using such scan modules as the scan heads 15, the cable connections to the central control would supply power to the scan heads and would carry data signals representing scanned indicia from the scan heads. The central control would no longer perform the actual decoding function but would perform only arbitration between the decoders in the separate scan modules to produce a single decode result as the ultimate output, for example by accepting the data from the module which first produces a valid decode result. As a further improvement, the scan module in such embodiments, either with or without the digitizer and decoding circuitry, could be formed on a single substrate using appropriate micro-machining techniques. Commonly assigned copending U.S. patent application Ser. No. 07/745,776 discloses a scanner module formed on a single substrate, and the disclosure of that application also is incorporated herein in its entirety by reference.

To further improve the efficiency of the control system in detecting indicia, the processor in the central control unit 30 could use a form of scan stitching algorithm. As an object moves through the scanning space 100, the scan line from each head will pass over the corresponding surface of the object. The speed of the object and the size of the indicia may be such that the scan line does not extend entirely across the indicia during a single movement of the scanning spot along the respective scan line. With scan stitching, when the decoder detects a reading of a part of a bar code on one traverse of the scan line by the beam spot, and another part of the code on one or more subsequent traverses, the decoder "stitches" together, concatenating or otherwise combining together as disclosed in the commonly assigned applications referenced below, a complete decoded representation of the indicia from the two parts. A prior art scan stitching operation is disclosed in U.S. Pat. No. 4,717,818. Commonly assigned copending applications Ser. Nos. 07/970,654, now U.S. Pat. No. 5,241,164 and 07/421,269, now U.S. Pat. No. 5,262,626, the disclosures of which are entirely incorporated herein by reference, each disclose details of scan stitching operations. In the present system, the decoding circuitry in the central control unit would stitch together partially read information from different scan line traverses of the spot from one optical scan head and/or from scanning signals from adjacent scan heads.

Figure 3A:
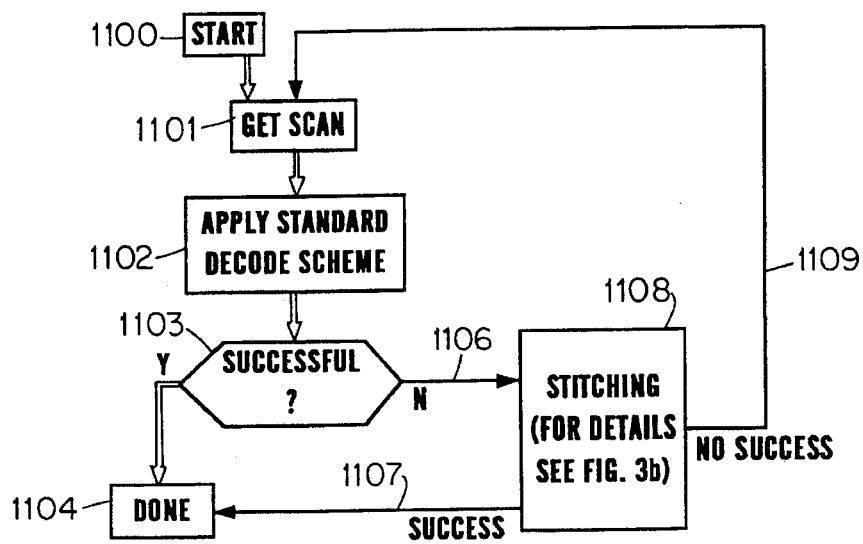
FIGS. 3a and 3b are flow charts of the implementation of scan stitching in the processor of the central control unit of FIG. 3.
Figure 3B:
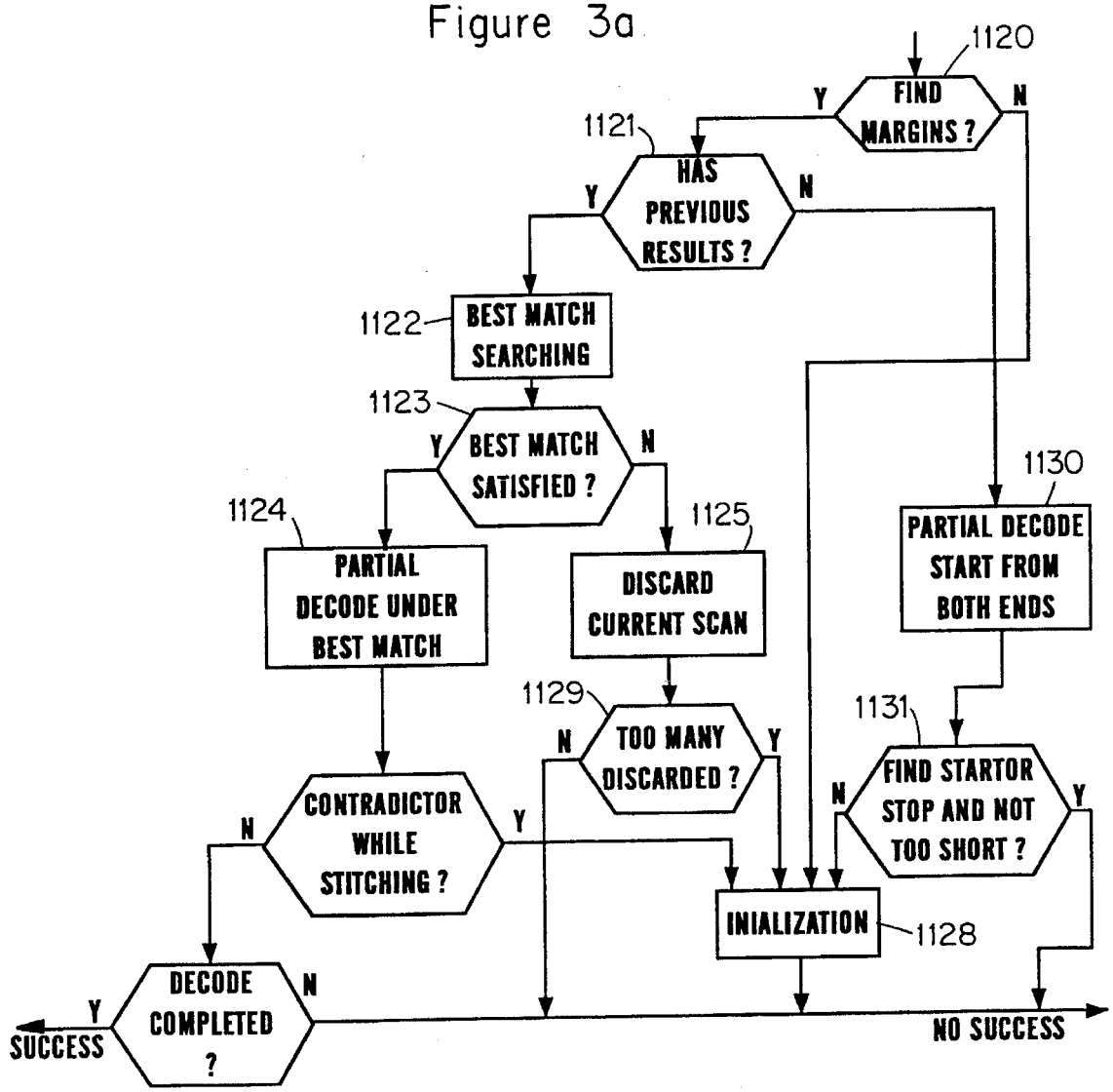

FIGS. 3a and 3b depict an exemplary implementation of stitching operations as described in the above-referenced '164 patent. The method first performs a standard decode attempt on every scan sent to the decoder (1100, 1101). If the result of this decode attempt (1102) is a completely decoded scan, no further processing is required (1103, 1104). If however, the result of this decode is a partially decoded scan, the data from the scan is saved for further processing (1106). The stitching algorithm (1108) continues to perform decode attempts on scan combinations until a fully decoded symbol is attained (1107), or a determination made that such decoding is not attainable (1109).

If the standard decode algorithm results in a complete decode (1103, 1104), no processing is performed. However, if the decode is not complete, and this decode includes enough information such as at least one start/stop character, the scan and the decoding result are saved for further processing (1106) by the stitching algorithm (1108). An additional scan is then performed (1109), which we assume also does not result in a complete decode (1103, 1106) so we again enter the stitching algorithm (1108). Very bad scans (i.e., those that do not contain more than a few characters of decodable data) are automatically discarded.

The stitching algorithm (1108) can be briefly described with reference to FIG. 3b.

If the subsequent scan is not too bad (for example, one can find margins of the symbol (1120, 1121) and the data not too short), a best match searching routine (1122) is performed on the previous scan and the current one. The best match routine will be described in detail subsequently. If the best match between the two scans is good enough (1123) and has some distance to the second best match, the decode result of current scan is stitched to the decode result of the previous scan (1124).

In the case of the best match is not good enough (1123, 1125) or has a too small distance to the second best match, the current scan is discarded, and if too many current scans are discarded successively, the decode result from previous scans are also discarded, and an initialization is performed (1128). The algorithm then restarts in the following scan (1109). If too many scans are not discarded (1129), additional scans are acquired (1109).

If the margins are not found (1120), an initialization (1128) is also performed and the algorithm restarts with a new scan (1109). Similarly, if margins are found but no previous stored results permits a suitable match (1130, 1131), an initialization (1128) is again performed and the algorithm restarts with a new scan (1109). If a start and stop character is found (1131), no initialization is performed, and additional scans are acquired (1109).

This process continues until no more scans are available or a completely decoding result to be formed either by the standard decode algorithm or by the stitching algorithm.

Figure 7:
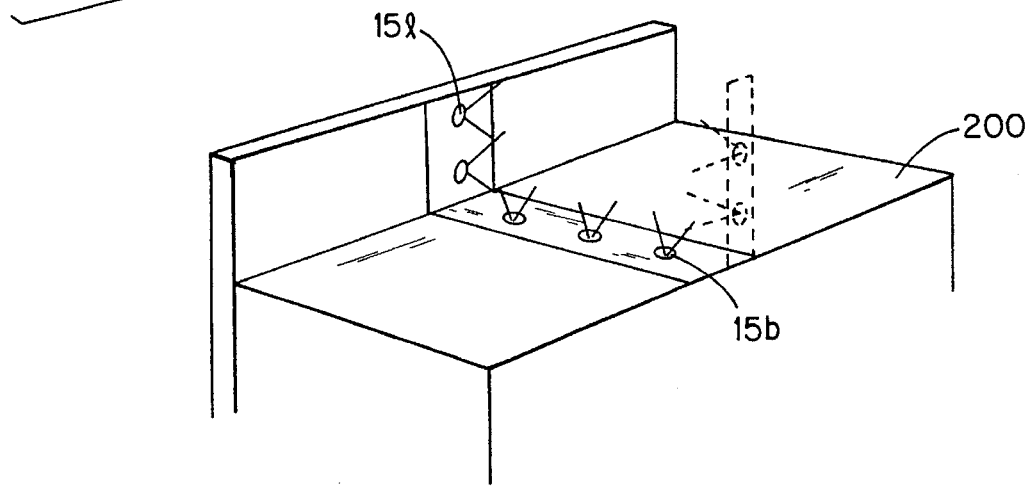
FIG. 7 shows an "inverted tunnel" scanner for scanning orthogonal side and bottom surfaces of items bearing indicia.
Figure 8:
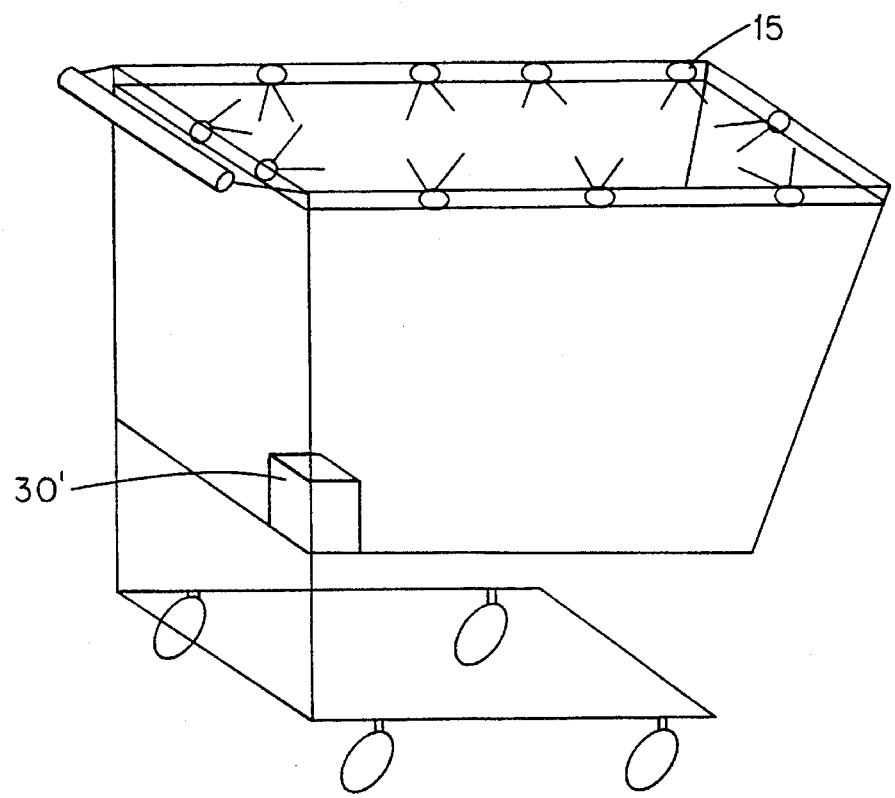
FIG. 8 shows a tunnel scanner mounted around the top opening of a grocery cart or the like to scan indicia as a shopper drops items into the cart.
Figure 9:
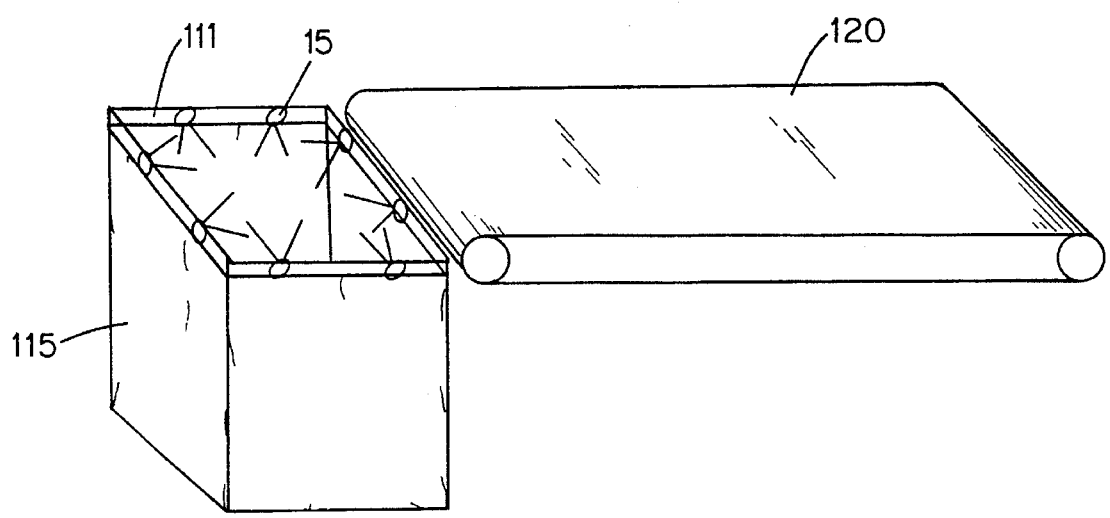
FIG. 9 depicts a tunnel scanner mounted around the top opening of a well used for bagging groceries or other purchases as a clerk or shopper drops items being purchased into the bag.

The present invention is not limited to use with a conveyor or to scanning of four different sides of the scanning space. FIGS. 7 to 9 provide a sampling of other embodiments using the scanning system of the present invention.

FIG. 7 shows an "inverted tunnel" scanner for scanning orthogonal side and bottom surfaces of items bearing indicia. Instead of a conveyor, the scanner system is associated with a counter 200, such as might be used with a point of sale terminal in a store. In this embodiment, the bottom scan heads 15b are incorporated into the lower section of the counter, below the surface thereof. The scan heads 15b face upwards to scan the bottom surfaces of items which a customer or clerk moves through the scanning space. A transparent plate covers the scan heads 15b.

Side scanners 151 are incorporated into a sideboard of the counter, behind another transparent plate. As in the embodiment of FIG. 2, the left side scan heads 151 scan a vertical side plane corresponding to the expected left side surface of items moving through the scanning space.

The inverted tunnel scanner may also include right side scanning heads, shown in dotted lines in FIG. 7. These additional scan heads would be incorporated into a right side component of the counter, for example into the vertical support for a writing stand or pedestal on which customers might write checks or sign credit card receipts. As in the embodiment of FIG. 2, the right side scan heads would scan a vertical side plane corresponding to the expected right side surface of items moving through the scanning space.

FIG. 8 shows an adaptation of the tunnel scanner to facilitate use thereof with a shopping cart. In this embodiment, the scan heads 15 are mounted around the four sides of the top of the shopping cart. The scan heads face inward. As such the top opening of the shopping cart through which a shopper normally drops items to be purchased also serves as the scanning space. This scanner system would scan indicia on the dropped items essentially in the same manner that the scan heads in the embodiment of FIG. 2 scanned indicia as items moved along the conveyor. One or more of the scan heads will scan the indicia on each item as the shopper drops each item into the cart. A central control unit 30' similar to that discussed above, would be mounted at an out of the way position on the cart and would connect to the scan heads by optical fibers and associated electrical leads, as in the conveyor belt embodiment (FIG. 2). In the embodiment of FIG. 8, the central control unit 30' would include a memory for accumulating data identifying the products in the cart and/or some means, such as an infrared or RF (radio frequency) transmitter for wireless communication to download the scanned indicia data to a remote host computer, or the like. If the central control unit 30' were mounted on or near the handle of the cart, the central control unit might also include a keyboard and display to permit other, manual inputs by the shopper. Price information could be received from the host computer via wireless link, for example to provide the shopper with a detailed account of shopping expenses in real-time.

The embodiment of FIG. 8 can also automatically subtract items removed from the cart, for example if the shopper changes his or her mind and decides not to purchase a particular item. In this regard, the system would include photoelectric cell arrangements, not shown, for sensing the direction of motion of items placed into and taken out of the shopping cart.

FIG. 9 depicts another application of the tunnel scanner. In this embodiment the scan heads 15 are mounted around the four sides of a bracket 111. The bracket supports a bag 115 from its lower edge. The shopper or a cashier places items for purchase into the bag 15 through the opening formed by the bracket 111. The bracket and bag may be at the end of a conveyor 120 such as used in checkout counters in grocery stores or at the end of a counter top on which the shopper normally places items before processing by a cashier. Instead of using the bracket 111, the scan heads may be arrayed around the top opening of a well into which the bag is placed before loading of items into the bag. In either case, insertion of items into the bag 115 will pass the items through the scanning space and result in an automatic scanning of indica on each item.

Although several preferred embodiments of the invention have been described in detail above, it should be clear that the present invention is capable of numerous modifications as would be apparent to one of ordinary skill in the art. Such modifications fall within the purview of the appended claims.

We claim:

1. A scanning system, comprising:

a plurality of optical scan units, each optical scan unit including means for emitting light toward an item bearing indicia and a means for receiving light reflected from the indicia and generating signals corresponding to the intensity of the reflected light, and a central control unit including means for combining together signals corresponding to the signals generated by at least two said scan units to fully decode information contained on the indicia, wherein one of said at least two scan units scans a portion of the indicia which is less than the entire indicia and generates a first signal corresponding to reflected light from said portion, and another of said at least two scan units scans another portion of the indicia which is less than the entire indicia and generates a second signal corresponding to reflected light from said another portion, and said first signal and said second signal are combined to fully decode the information contained on the indicia.

2. A system as recited in claim 1, further comprising:

means for storing said first signal and said second signal prior to combining said first and said second signals.

3. A system as recited in claim 1, wherein said portion of the indicia and said another portion of the indicia are scanned simultaneously.

4. A system as recited in claim 1, wherein said portion of the indicia and said another portion of the indicia are scanned during respective different time periods sequentially.

5. A scanning system according to claim 1, further comprising means for defining a space through which the item bearing an indicia will move; wherein:

each said optical scan unit transmits signals corresponding to the generated signals and emits light along a different line of sight toward the item as it moves through said space;

said means for receiving light includes; a charge coupled device sensor array a first one of the optical scan units is configured to nominally scan and sense reflected light with respect to a first plane;

a second one of the optical scan units is configured to nominally scan and sense reflected light with respect to a second plane which is angularly displaced with respect to said first plane;

said central control unit is separate and spaced apart from the optical scan units and includes means for processing the signals transmitted from the optical scan units to determine the information contained in the indicia.

6. A system as in claim 5, wherein said means for defining a space comprises a conveyor carrying items to be scanned, and a bracket supporting at least some of the optical scan units, said bracket extending from a point alongside the conveyor out away from and across the conveyor.

7. A system as in claim 5, wherein (i) said conveyor is comprised of a first conveyor belt for carrying the item into said space through which the item will move, and a second conveyor belt, disposed apart from said first conveyor belt with a separation space therebetween, for carrying the item out of said space through which the item will move, and at least some of the optical scan units have a line of sight through said separation space, and (ii) said item simultaneously contacts said first conveyor belt and said second conveyor belt to move through said space.

8. A system as in claim 7, wherein said bracket extends from a point alongside the separation space and across the separation space.

9. A system as in claim 6, wherein said conveyor is comprised of a first conveyor belt for carrying the item into said space through which the item will move, and a second conveyor belt, disposed apart from said first conveyor belt with a separation therebetween, for carrying the item out of said space, said first conveyor belt and said second conveyor belt each having a respective co-planar surface on which the item is conveyed.

10. A system as in claim 5, wherein said means for emitting light comprises a light emitting diode.

11. A system as in claim 10, wherein said means for emitting light further comprises a lens for focussing the light emitted by said light emitting diode.

12. A system as in claim 5, wherein said means for processing includes means for digitizing and signals transmitted from the optical scan units.

13. A system as in claim 5, wherein said central control unit further includes means for driving said means for emitting light.

14. A system as in claim 5, wherein each said optical scan unit is configured to nominally scan and sense reflected light with respect to a plane parallel to the direction of movement of said item.

15. A system as in claim 5, wherein said plurality of optical scan units nominally scans and senses reflected light with respect to only four planes, and each said plane is parallel to the direction of movement of said item and orthogonal to the other said planes.

16. A system as in claim 5, wherein a common plane substantially perpendicular to a direction of movement of the item is impinged by each of said plurality of scan units.

17. A scanning system, comprising:
- a plurality of optical scan units, each optical scan unit including means for optically sensing variations in light reflectivity on a surface of an item bearing an indicia and generating signals responsive to sensed variations in light reflectivity,
- wherein a first one of the optical scan units is oriented for optically sensing a first portion of the indicia which is less than the entire indicia and generating a first signal responsive to the sensed variations in light reflectivity of said first portion, and
- a second one of the optical scan units is oriented for optically sensing a second portion of the indicia which is less than the entire indicia and generating a second signal responsive to the sensed variations in light reflectivity of said second portion;
- a central control unit for processing the generated signals to determine information contained in the indicia by combining at least the first and the second signals to fully decode the information contained in the indicia.

18. A system as recited in claim 17, further comprising:
- means for storing said first signal and said second signal prior to combining said at least first and said second signals.

19. A system as recited in claim 17, wherein said first optical scan unit senses said first portion of the indicia and said second optical scan unit senses said second portion of the indicia simultaneously.

20. A system as recited in claim 17, wherein said first scan unit senses said first portion of the indicia and said second scan unit senses said second portion of the indicia during respective different time periods sequentially.

21. A scanning system according to claim 17, further comprising:
- means for illuminating the space; and
- means for defining a space through which the item bearing the indicia will move;
- wherein each said optical scan unit optically senses variations in light reflectivity on the surface of said item as the item moves through said space and includes means for transmitting said generated signals;
- wherein a first one of the optical scan units is oriented for optically sensing along a first line of sight, and
- a second one of the optical scan units is oriented for optically sensing along a second line of sight angularly displaced with respect to said first line of sight;
- wherein said central control unit is separate and spaced apart from the first and second optical scan units and processes the signals transmitted from the optical scan units to determine the information contained in the indicia.

22. A system as in claim 2, wherein said illuminating means is separate and spaced apart from said optical scan units.

23. A system as in claim 22, wherein said illuminating means includes at least one light emitter disposed proximate to a side of said space.

24. A system as in claim 21, wherein the means to illuminate comprise a light emitting diode in each optical scan unit.

25. A system as in claim 21, wherein each optical scan unit comprises a charge coupled device sensor array.

26. A system as in claim 21, wherein said central control unit includes means for digitizing and signals transmitted from the optical scan units.

27. A system as in claim 21, wherein said central control unit further includes means for driving said illuminating means.

28. A system as in claim 21, wherein each said optical scan unit is configured to nominally scan and sense reflected light with respect to a plane parallel to the direction of movement of said item.

29. A system as in claim 21, wherein said plurality of optical scan units nominally scans and senses reflected light with respect to only four planes, and each said plane is parallel to the direction of movement of said item and orthogonal to the other said planes.

30. A system as in claim 21, further comprising a conveyor for moving the item through said space.

31. A system as in claim 30, wherein (i) said conveyor is comprised of a first conveyor belt for carrying the item into said space through which the item will move, and a second conveyor belt, disposed apart from said first conveyor belt with a separation space therebetween, for carrying the item out of said space through which the item will move, and at least one of the optical scan units has a line of sight through said separation space, and (ii) said item simultaneously contacts aid first conveyor belt and said second conveyor belt to move through said space.

32. A system as in claim 31, wherein the means for defining said space through which items will move includes a bracket which supports at least some of the plurality of optical scan units and extends from a point alongside the separation space and across the separation space.

33. A system as in claim 30, wherein said conveyor is comprised of a first conveyor belt for carrying the item into said space through which the item will move, and a second conveyor belt, disposed apart from said first conveyor belt with a separation therebetween, for carrying the item out of said space, said first conveyor belt and said second conveyor belt each having a respective co-planar surface on which the item is conveyed.

34. A system as in claim 21, wherein a common plane substantially perpendicular to a direction of movement of the item is impinged by each of said plurality of scan units.

35. A method of scanning an indicia comprising:
(1) optically sensing from a first optical scan unit variations in light reflectivity of a portion of the indicia which is less than the entire indicia on a surface of an item bearing the indicia and producing first signals responsive to variations in light reflectivity sensed, and
(2) optically sensing from a second optical scan unit variations in light reflectivity of another portion of the indicia which is less than the entire indicia on the surface of the item and producing second signals responsive to variations in light reflectivity sensed; and
centrally processing the produced signals by combining signals corresponding to the first and the second signals to produce a single decoded representation of information carried by the indicia so as to fully decode the information contained in the indicia.

36. A method as recited in claim 35, further comprising the step of:

storing said first signals and said second signals prior to combining signals.

37. A method as recited in claim 35, wherein said portion of the indicia and said another portion of the indicia are sensed simultaneously.

38. A method as recited in claim 35, wherein said portion of the indicia and said another portion of the indicia are sensed during respective different time periods sequentially.

39. A method of scanning an indicia according to claim 35, further comprising illuminating a scanning space and transmitting the first and second signals to a central control, and wherein:

said optical sensing is performed along a first line of sight from the first optical scan unit variations in light reflectivity on a surface of an item bearing an indicia as the item moves through the scanning space and along a second line of sight from the second optical scan unit variations in light reflectivity on a surface of the item as the item moves through the scanning space, said second line of sight is angularly displaced from said first line of sight said central control is separate from the first and the second optical scan units; and said processing includes processing the transmitted signals in the central control.

40. A method as in claim 39, wherein said indicia comprises a bar code.

41. A system as in claim 39, wherein said processing includes digitizing and decoding signals transmitted from the optical scan units.

42. A system as in claim 39, wherein each line of sight nominally scans and senses reflected light with respect to a plane parallel to the direction of movement of said item.

43. A method as in claim 39, wherein each said scan unit nominally scans and senses reflected light with respect to a different plane, and each said plane is parallel to the direction of movement of said item and orthogonal to the other said planes.

44. A method as in claim 39, further comprising:

concurrently with the simultaneously sensing step, optically sensing along a third line of sight from a third optical scan unit variations in light reflectivity on a surface of the item as the item moves through the scanning space and producing third signals responsive to variations in light reflectivity sensed along said third line of sight, said third line of sight being angularly displaced from said first and second lines of sight; and transmitting said third signals to the central control;

wherein the processing step includes processing of the third signals.

45. A method as in claim 44, further comprising:

concurrently with the simultaneously sensing step, optically sensing along a fourth line of sight from a fourth optical scan unit variations in light reflectivity on a surface of the item as the item moves through the scanning space and producing fourth signals responsive to variations in light reflectivity sensed along said fourth line of sight, said fourth line of sight being angularly displaced from said first, second and third lines of sight; and transmitting said third signals to the central control;

wherein the processing step includes processing of the fourth signals.

* * * * *